United States Patent
Bernu

(10) Patent No.: US 6,908,522 B1
(45) Date of Patent: Jun. 21, 2005

(54) LEAF BINDING METHOD AND COMPOSITIONS THEREFOR

(75) Inventor: Cory Bernu, Farmington, MN (US)

(73) Assignee: Chemstar Products Company, Minneapolis, MN (US)

( * ) Notice: Subject to any disclaimer, the term of this patent is extended or adjusted under 35 U.S.C. 154(b) by 0 days.

(21) Appl. No.: 10/607,675

(22) Filed: Jun. 24, 2003

Related U.S. Application Data

(60) Provisional application No. 60/391,460, filed on Jun. 25, 2002.

(51) Int. Cl.$^7$ .......................... B32B 31/04; B32B 31/12
(52) U.S. Cl. .......................... 156/94; 156/60; 156/317; 156/318; 156/336; 47/58.1 R
(58) Field of Search .......................... 156/60, 94, 317, 156/318, 336; 47/58.1 R

(56) References Cited

U.S. PATENT DOCUMENTS

| | | | | |
|---|---|---|---|---|
| 4,374,217 A | * | 2/1983 | Miyake et al. | 524/47 |
| 5,100,948 A | * | 3/1992 | Aydin et al. | 524/425 |
| 6,280,514 B1 | * | 8/2001 | Lydzinski et al. | 106/122 |
| 2001/0032414 A1 | | 10/2001 | White, II et al. | 47/58.1 |

* cited by examiner

Primary Examiner—Sam Chuan Yao
(74) Attorney, Agent, or Firm—Vidas, Arrett & Steinkraus

(57) ABSTRACT

A method of binding leaves or other organic debris utilizing an adhesive composition comprising a water soluble or dispersible polymer. The method includes the step of coating upwardly facing leaves and/or other organic debris with an adhesive composition to bond them together into larger sections. The adhesive composition includes an anti-slip additive to counter slipperiness of the pile when wet.

10 Claims, No Drawings

LEAF BINDING METHOD AND COMPOSITIONS THEREFOR

CROSS-REFERENCE TO RELATED APPLICATION

This application claims the benefit of prior U.S. Provisional Application No. 60/391,460, filed on Jun. 25, 2002.

BACKGROUND OF THE INVENTION

In U.S. published application U.S. 20010032414 A1, published Oct. 25, 2001, attached hereto and incorporated herein by reference in its entirety, there is described a method of containing organic debris such as leaves in piles or layers. According to this document the method utilizes an adhesive composition, coating the generally upward facing leaves in order to bond them together into larger sections. Once the separate leaves are bonded together by the coating, the larger sections provide a protective covering that keeps the wind from disturbing the pile or layer. Further, in some instances the coating may include a biological agent that facilitates the decomposition of the organic debris. In other instances the coating may also include a fertilizer that would be beneficial if the organic debris was used as mulch spread around plants. Also disclosed are methods for applying coating using a distributing device. The following is taken from the Detailed Description section of that publication:

"This invention is a method for containing organic debris is comprised of an adhesive layer applied to the outside of a pile or layer of organic debris. In the preferred embodiment the adhesive layer is biodegradable and non-toxic to plants and animals so that when organic debris is dumped in a landfill or used as mulch it does not pollute the soil or harm plants and animals. For optimum results, the adhesive layer would be made of all natural components, the adhesive would be derived from animal and vegetable materials that would also be friendly to the environment. The adhesive layer could come in the form of a powder or foam or as two parts whereby another component would be added such as water. One embodiment is a mixture by volume of: 2% ground psyllium husk; 33% denatured alcohol that acts as a suspending agent; and 65% water. The water would either be mixed with the powder in a bottle, in a hose attachment similar to lawn fertilizer sprayers or after the powder had first been sprinkled on leaves. The adhesive layer could include one or more additives such as; a biological agent that would accelerate the decomposing process of the yard debris, a fertilizing agent that would be beneficial to plants if the yard debris was used as a mulch spread around plants, a coloring agent so that when a person was distributing it over leaves they would know if the pile had been adequately covered. The adhesive layer, after drying, would be a non-gumming solution that would not damage the vacuuming equipment used to remove leaves from the side of the road.

"The adhesive layer may be distributed with various equipment, for example, the distributing device is a pump spray bottle similar to the ones used with consumer cleaning solutions. The nozzle on the distributing device can be adjusted to spray a stream or a wide pattern and is non-clogging. In other embodiments the distributing device could be a can with wide holes to effectively distribute a powdered version of coating, or it could be a can under pressure to distribute an aerosol or foam version of coating. In other embodiments the distributing device could be a garden pump sprayer commonly used by homeowners to distribute herbicides. In other embodiments distributing device could be an industrial sprayer commonly used to distribute grass seed along highways. In still further embodiments the distributing device could be a lawn-fertilizing sprayer that includes a bottle that attaches on a garden hose (nozzle end sprayer such as the Ortho Dial'n Spray®) that would mix a powder or liquid concentrate with water as coating was sprayed on leaves. As the adhesive layer dries, leaves and other debris are bonded together into one piece so that blowing wind and passing cars cannot remove the large top layer and redistribute the pile. In other embodiments, the adhesive could come in the form of a powder that would be first sprinkled over leaves and then moistened with water that would begin the bonding of all loose leaves into one solid top component. The adhesive could also come with a coloring agent that would show the user that the entire pile of leaves had been adequately covered. In other embodiments, the adhesive could be distributed as mentioned above however, as it dries it would form a hard coat over leaves like paint on any surface. The aerodynamic qualities, shape and mass of coating would keep leaves in place in a pile or a few heavy objects like rocks could be placed on the pile.

"One embodiment of the invention is to apply the adhesive layer to organic debris to control the movement of the organic debris from where the decomposition of the debris is advantageous. For example, autumn leaves may be blown by gas or electric powered leaf blowers from golf turf areas or home lawns into natural area and then treated with an adhesive layer. The adhesive layer would ensure the leaves do not get blown around. The decomposition of the leaves will enhance desirable soil characteristics (increased water retention, decreased erodability, reduction of weedy under story growth, increased health of desirable vegetation). The advantages of mulching is well know, see, for example, Mulching for a Healthy Landscape, Diane Relf, Virginia Tech Publication Number 426-724. This would also result in golfers being able to find errant golf balls more quickly.

"Another embodiment of the invention is to apply an adhesive layer to autumn leaves arranged in a doughnut shape around the base of a tree. The adhesive layer would ensure the leaves do not get blown around. The decomposition of the leaves will enhance desirable soil characteristics (increased water retention, decreased erodability, and reduction of weedy under story growth, with resulting increased health of desirable vegetation. The leaves act as a barrier to plant growth from beneath the doughnut structure thus making lawn maintenance easier.

"Addition of live biological organisms, including but not limited to *Bacillus* sp., *Pseudomonas* sp., *Trichoderma* sp., *Erwinia* sp., *Pichia* sp., *Candida* sp., *Cryptococcus* sp., *Talaromyces* sp., *P. fumosoreus, B. bassiana, Chaetomium* sp., *Gliocladium* sp., *Aureobasidium* sp., *Dabaryomyces* sp., *Exophilia* sp., *Ampelomyces* sp., and *Mariannaea* sp will result in faster leaf breakdown accelerating removal of leaves and increase the benefits of leaf breakdown listed above. BIO*Bplus™. a product of GreenReleaf™ by Sybron is a commercially produced example of a mixture of bacteria specifically selected to speed breakdown of organic debris in lawns.

The biological organisms may also be nitrogen-fixing organisms such as certain members of the cyanobacteria that would result in natural nitrogen fixation and increased health of the plant community. One embodiment of the subject invention is to select for biological agents that are tolerant to and thus well suited to a use in the adhesive layer.

"Organic debris may be leaves resulting from autumn or other seasonal leaf fall, leaves and other yard debris (leaves, flowers, stems, fruits) resulting from yard activities. Yard activities may be, for example, cultivation, cutting, herbicide application, or withholding of irrigation water.

"The adhesive may contain one or more constituents such as surface-active agents and other ingredients. As examples for a surface-active agent, alkylsulfate esters, alkylsulfates, alkylarylethers and their polyoxyethylenes, polyethyleneglycols, polyhydric alcohol esters, and sugar alcohol derivatives can be given. As examples for other ingredients for the adhesive, a sticking agent and a dispersant, such as casein, gelatin, polysaccharides including starch, gum arabic, cellulose derivatives and alginic acid, lignin derivatives, bentonite and synthetic aqueous polymers including polyvinyl alcohol, polyvinyl pyrrolidone and polyacrylic acid, and a stabilizer, such as PAP (acidic isopropyl phosphate), BHT (2,6-di-tert-butyl-4-methylphenol), BHA (2-/3-tert-butyl-4-methoxyphenol), vegetable oils, mineral oils, fatty acids and fatty acid esters, can be given. Examples of adhesives and binding agents are Agar, Alginates, Amine Oxides, Cocamidopropyl Hydroxysultaine, Coco Amido Betaine, Coconut Diethanolamide, Corn Starch, Cotton fibres, Dextrin, Diatomaceous Earth, Dihydroxyethyl Tallow Glycinate, Ethylcellulose, Gellan Gum, Guar, Hydroxy Methyl Cellulose, Hydroxyethyl Cellulose, Hydroxypropylmethylcellulose, Lauric Diethanolamide, Methylcellulose, Polyvinyl Alcohol, Primary Alcohol Ethoxylates, Sodium Carboxymethylcellulose, Xanthan Gum.

"The adhesive layer may include a plant fertilizer containing the plant macronutrients Nitrogen, Potassium and Phosphorus or a complete fertilizer including the macro and micro plant nutrients as exemplified by Miracle Gro® (The Scotts Company) or may be customized for specific applications.

"The following examples illustrate the practice of the present invention and should not be construed as limiting its scope.

EXAMPLE 1

"A solution was made with: 2% psyllium husk; 33% denatured alcohol; and 65% water. This created a solution with an adequately high solid content of the polymer and a low viscosity enabling it to be sprayed in a wide pattern by a common pump bottle sprayer found with consumer cleaning products. Using other concentrations of the ingredients in other experiments, the solution was found to have either too high of a viscosity to be sprayed through the pump sprayer or too little concentration of the polymer to adequately hold the leaves together.

"Using the solution with the ratio noted above and a common pump bottle sprayer, an even layer was sprayed on a small pile of maple leaves. In approximately two hours the solution had dried and a small house fan was directed on the pile of leaves at various speeds. The dried layer of the solution kept the leave from being blown out of the pile no matter what speed the fan was turned on.

EXAMPLE 2

"A second experiment was conducted using a solution of: 75% polyvinyl acetate; and 25% water. Again using these ingredients in other experiments there was the same problem as noted above in finding a proper solution ratio that would hold the leaves in place and that could also be distributed by using a pump bottle sprayer.

"Using the solution with the ratio of 75% polyvinyl acetate and 25% water, a thorough layer was sprayed on another pile of maple leaves. Once the solution had dried in approximately two hours a house fan was pointed at the leaves. Again this dried solution kept the leaves in one place.

EXAMPLE 3

"The adhesive solution of example 1. is amended with Miracle Gro™ a product of The Scotts Company. Application to naturally dehisced maple leaves in a natural area results in a lower rate of leaf redistribution and a faster rate of decay than untreated leaves. Rate of leaf decay is measured by enclosing treated or untreated leaves in bags made of plastic window screen material, putting bags in a natural area under the maple trees and measuring the dry weight of leaf material in the spring. The treated leaves weigh significantly less than the untreated.

EXAMPLE 4

"The adhesive solution of example 1 is amended with the recommended rates of BIO*Bplus™ a product of GreenReleaf™ by Sybron. Application to naturally dehisced maple leaves in a natural area results in a lower rate of leaf redistribution and a faster rate of decay than untreated leaves. The data are collected as in Example 3."

Adhesive materials such as contemplated in U.S. 20010032414 A1 are water soluble or dispersible and biodegradable. This property can present a disadvantage in some uses because their water solubility/dispersibility can render the leaf bundle surfaces very slippery when wet. Early in the morning when dew is heavy, or after a rain, people coming in contact with the leaf pile, such as children playing in the leaves, may slip and injure themselves. Also, if the applied material is overspread a surrounding walkway, driveway, boulevard, street, etc, a risk of slipping and of consequent injury can be created.

SUMMARY OF THE INVENTION

The present invention is directed to the reduction of wet slipperiness of a pile of leaves and/or other organic debris or of another area to which a leaf binding adhesive has been intentionally, or unintentionally, applied. In one aspect the invention comprises method of binding leaves or other organic debris utilizing an adhesive composition comprising a water soluble or dispersible polymer, the method including the step of coating upwardly facing leaves and/or other organic debris with an adhesive composition to bond them together into larger sections, the invention wherein the adhesive composition includes an anti-slip additive. In other aspect the invention is an organic debris adhesive composition which includes an anti-slip agent to counter slipperiness of the pile when wet.

DETAILED DESCRIPTION OF THE INVENTION

The adhesive may be based on natural or synthetic water soluble or dispersible binder polymers which are preferably biodegradable. Suitable examples of binder polymers include pregellatinized corn or potato starches and other starch derivatives, guar, gum arabic, xanthan gum, plantago, hydroxy methyl cellulose, hydroxyethylated cellulose, hydroxypropylated cellulose, sodium carboxymethylcellulose, alginic acid, and lignin derivatives. Other starches, other cellulosics, and other polysaccharides may also be used. Examples of synthetic polymers include polyvinyl alcohol, polyvinyl pyrrolidone and polyacrylic acid. A preferred binder polymer is a pre-gelatinized corn meal, although any other pre-gelatinized starch or starch derivative will also work well. Any other material mentioned in U.S. 20010032414 A1 may be employed.

The anti-slip agents contemplated in this invention are water insoluble particles having a size and density which allows the particles to be readily dispersed in the adhesive but which have a size which is large enough to reduce surface slipperiness of the adhesive layer when wet. A suitable average size range for the anti-slip particles is from about 100 microns to about 3000 microns. Preferred anti-slip agents are coarse sand or coarsely ground agricultural grains such as corn-grits. The average particle size distribution of the sand preferably will range from 150 microns to 1500 microns. Corn grits preferably will have an average size range of from 200 microns to 2000 microns. Other anti-slip agents could include, coarse urea prills, coarse sawdust, ground corncobs, crushed limestone, etc. The grits or other organic anti-slip agents have the advantage of being biodegradable while the sand is not.

In some embodiments of the invention the formulation comprises a blend of the adhesive polymer material and the anti-slip agent with relative dry weight ratios which range from about 20:80 to about 80:20 starch to anti-slip agent. Preferred formulations comprise from about 40 to about 60% adhesive polymer with the balance being the anti-slip agent. Particular preferred formulations contain approximately equal weights of both components.

The following sample formulations are illustrative of the invention.
- 50% pre-gelatinized corn meal
- 50% coarse sand (particle size distribution of 150 microns to 1400 microns)
- 50% pre-gelatinized corn meal
- 50% corn grits (particle size distribution of 200 microns to 2000 microns)
- 50% starch derivative (hydroxypropylated, carboxymethylated, etc.)
- 50% corn grits
- 50% guar
- 50% corn grits or coarse sand
- 50% plantago
- 50% coarse sand or corn grits The formulations suitably may be provided as a dry blend powder. In one method of application, the leaf pile is first wetted, e.g. with a garden hose. The dry blend powder is then applied directly onto the pile, for instance using a large shaker or scoop or a broadcast sifter. The pile is then sprayed with water again to hydrate the powder to activate the adhesive. Alternatively, the inventive composition may be applied in any other manner described in U.S. 20010032414 A1. Other additives may be incorporated into the formulation, for instance, to aid aqueous suspension of the anti-slip agent or to assist in decomposition of the organic debris. The additives described in U.S. 20010032414 A1 may be employed.

All published documents, including all U.S. patent documents, mentioned anywhere in this application are hereby expressly incorporated herein by reference in their entirety. Any copending patent applications, mentioned anywhere in this application are also hereby expressly incorporated herein by reference in their entirety.

The above examples and disclosure are intended to be illustrative and not exhaustive. These examples and description will suggest many variations and alternatives to one of ordinary skill in this art. All these alternatives and variations are intended to be included within the scope of the claims. Those familiar with the art may recognize other equivalents to the specific embodiments described herein which equivalents are also intended to be protected by the claims.

What is claimed is:

1. A method of binding leaves or other organic debris utilizing an adhesive composition comprising a water soluble or dispersible polymer, the method including the step of coating upwardly facing leaves and/or other organic debris with an adhesive composition to bond them together into larger sections, the invention wherein the adhesive composition includes an anti-slip additive that is a water insoluble particulate material and wherein the average size range for the anti-slip particles is from about 100 microns to about 3000 microns.

2. The method of claim 1 wherein the anti-slip agent is coarse sand, a coarsely ground agricultural grains, coarse urea prills, coarse sawdust, ground corncobs, crushed limestone, or a mixture of any thereof.

3. The method of claim 1 wherein the water soluble or dispersible binder polymer and the anti-slip additive are present in a relative dry weight ratio of from about 20:80 to about 80:20 binder polymer to anti-slip agent.

4. The method of claim 1 wherein the water soluble or dispersible binder polymer is a polysaccharide or a derivative thereof, a cellulose or a derivative thereof, or a mixture thereof.

5. The method of claim 1 wherein the water soluble or dispersible binder polymer is a member of the group consisting of pregellatinized starches, starch derivatives, guar, gum arabic, xanthan gum, plantago, hydroxy methyl cellulose, hydroxyethylated cellulose, hydroxypropylated cellulose, sodium carboxymethylcellulose, alginic acid, lignin derivatives, polyvinyl alcohol, polyvinyl pyrrolidone, polyacrylic acid and mixtures thereof.

6. The method of claim 1 wherein the soluble or dispersible binder polymer is a a pregellatinized starch, a starch derivative or a mixture of any thereof.

7. The method of claim 1 wherein the water soluble or dispersible binder polymer is a pregellatinized corn or potato starch, a hydroxypropylated starch, a carboxymethylated starch or a mixture of any thereof.

8. A method of binding leaves or other organic debris utilizing an adhesive composition comprising a water soluble or dispersible polymer, the method including the step of coating upwardly facing leaves and/or other organic debris with an adhesive composition to bond them together into larger sections, the invention wherein the adhesive composition includes an anti-slip additive that has an average size range of 200 microns to about 3000 microns.

9. A method of binding leaves or other organic debris utilizing an adhesive composition comprising a water soluble or dispersible polymer, the method including the step of coating upwardly facing leaves and/or other organic debris with an adhesive composition to bond them together into larger sections, the invention wherein the adhesive composition includes an anti-slip additive that comprises sand having an average particle size of 150 microns to 1500 microns.

10. A method of binding leaves or other organic debris utilizing an adhesive composition comprising a water soluble or dispersible polymer, the method including the step of coating upwardly facing leaves and/or other organic debris with an adhesive composition to bond them together into larger sections, the invention wherein the adhesive composition includes an anti-slip additive that comprises corn grits having an average size range of from 200 microns to 2000 microns.

* * * * *